US012707455B2

(12) United States Patent
Fu et al.

(10) Patent No.: US 12,707,455 B2
(45) Date of Patent: Aug. 11, 2026

(54) SCHEDULING METHOD, PARAMETER TRANSMISSION METHOD, APPARATUS, DEVICE, SYSTEM, AND MEDIUM

(71) Applicant: HUAWEI TECHNOLOGIES CO., LTD., Shenzhen (CN)

(72) Inventors: Hongliang Fu, Shanghai (CN); Suwen Wu, Shanghai (CN); Jian Zhang, Shanghai (CN); Juan Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 18/757,601

(22) Filed: Jun. 28, 2024

(65) Prior Publication Data

US 2024/0357580 A1 Oct. 24, 2024

Related U.S. Application Data

(63) Continuation of application No. PCT/CN2022/141230, filed on Dec. 23, 2022.

(30) Foreign Application Priority Data

Dec. 31, 2021 (CN) ........................ 202111668300.3

(51) Int. Cl.
*H04W 72/1263* (2023.01)
*H04W 72/542* (2023.01)

(52) U.S. Cl.
CPC ..... *H04W 72/1263* (2013.01); *H04W 72/542* (2023.01)

(58) Field of Classification Search
CPC ........... H04W 72/1263; H04W 72/542; H04W 88/085; H04W 92/12; H04W 72/54;
(Continued)

(56) References Cited

U.S. PATENT DOCUMENTS

2014/0126358 A1* 5/2014 Bedekar ................ H04L 47/127
370/230
2016/0241468 A1 8/2016 Sabella et al.
(Continued)

FOREIGN PATENT DOCUMENTS

CN 112351432 A 2/2021
CN 114466464 A 5/2022
(Continued)

OTHER PUBLICATIONS

European Search Report issued in corresponding European Application No. 22914510.7, dated Feb. 28, 2025, pp. 1-9.
(Continued)

*Primary Examiner* — Juan A Torres
(74) *Attorney, Agent, or Firm* — HAUPTMAN HAM, LLP

(57) ABSTRACT

This application discloses a scheduling method, a parameter transmission method, an apparatus, a device, a system, and a medium, which belong to the field of communication technologies. The method includes: obtaining a first predicted transmission parameter of each of a plurality of cells, where the first predicted transmission parameter indicates a predicted transmission parameter required for each cell during scheduling in a current periodicity; the plurality of cells are cells included in a signal coverage area of an RU, and a maximum transmission bandwidth between the RU and a BU is less than a sum of maximum transmission bandwidths required by the plurality of cells; and scheduling at least one of the plurality of cells based on the first predicted transmission parameters of the plurality of cells.

19 Claims, 6 Drawing Sheets

(58) Field of Classification Search

CPC ..... H04W 72/20; H04W 28/16; H04W 16/14; H04W 72/0453; H04W 72/0457; H04L 5/0044; H04L 41/147; H04L 43/0882; H04L 47/828; H04L 25/0202; Y02D 30/70

USPC ............... 455/450, 422.1, 464, 509; 370/329

See application file for complete search history.

(56) References Cited

U.S. PATENT DOCUMENTS

| | | | | |
|---|---|---|---|---|
| 2020/0084667 | A1 | 3/2020 | Ruffini et al. | |
| 2020/0092903 | A1* | 3/2020 | Moon | H04W 72/21 |
| 2021/0152246 | A1 | 5/2021 | Qi et al. | |
| 2021/0385013 | A1* | 12/2021 | Berger | H04L 5/003 |
| 2022/0022221 | A1* | 1/2022 | Papasakellariou | H04W 76/28 |
| 2023/0069308 | A1* | 3/2023 | Zhu | H04L 5/001 |

FOREIGN PATENT DOCUMENTS

| | | | |
|---|---|---|---|
| JP | 2010507299 | A | 3/2010 |
| JP | 2020535735 | A | 12/2020 |
| WO | 2017035746 | A1 | 3/2017 |

OTHER PUBLICATIONS

Japanese Office Action issued in corresponding Japanese Patent Application No. 2024-539599, dated May 27, 2025, pp. 1-8.

* cited by examiner

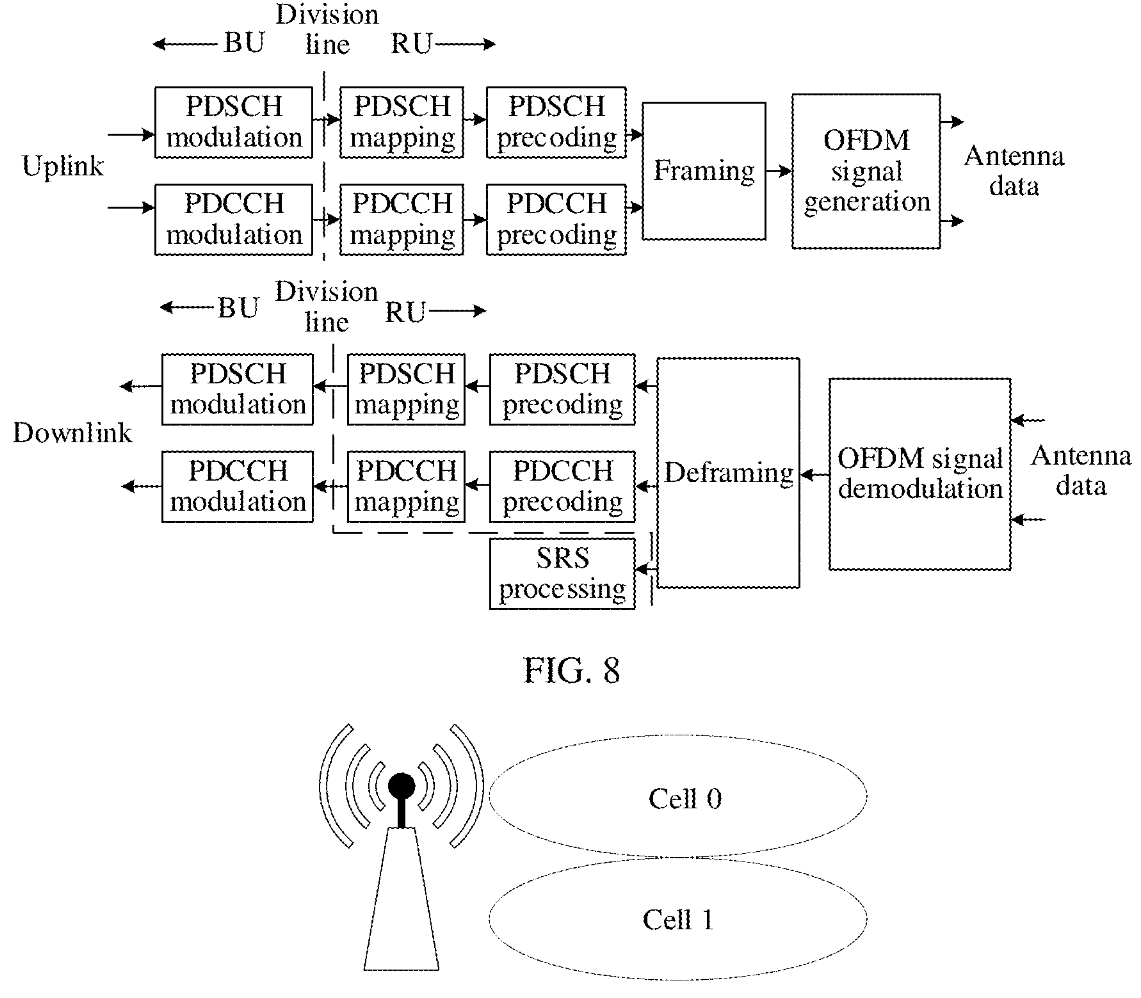
FIG. 8
FIG. 9
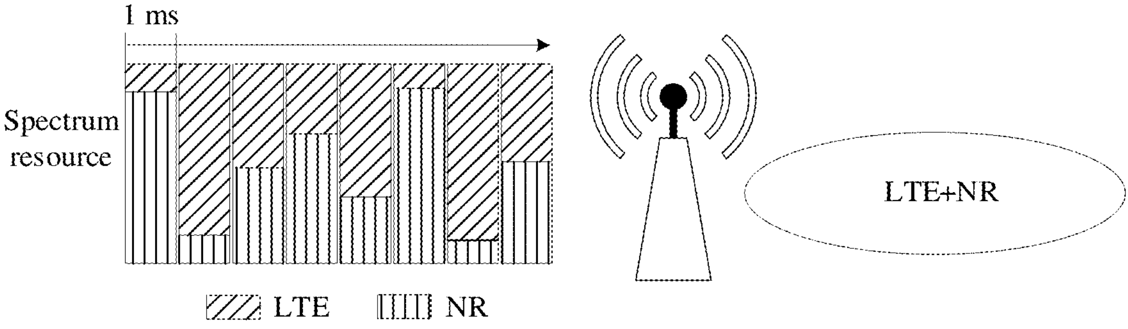
FIG. 10

SCHEDULING METHOD, PARAMETER TRANSMISSION METHOD, APPARATUS, DEVICE, SYSTEM, AND MEDIUM

CROSS-REFERENCE TO RELATED APPLICATIONS

This application is a continuation of International Application No. PCT/CN2022/141230, filed on Dec. 23, 2022, which claims priority to Chinese Patent Application No. 202111668300.3, filed on Dec. 31, 2021. The disclosures of the aforementioned applications are hereby incorporated by reference in their entireties.

TECHNICAL FIELD

This application relates to the field of communication technologies, and in particular, to a scheduling method, a parameter transmission method, an apparatus, a device, a system, and a medium.

BACKGROUND

A base station usually includes a baseband unit (baseband unit, BU) and a radio unit (radio unit, RU). The BU and the RU are usually connected via optical fibers, and a network between the BU and the RU is referred to as a fronthaul network. The costs of optical fiber deployment are high. Therefore, the fronthaul bandwidth becomes a valuable resource.

Currently, the fronthaul bandwidth mainly depends on channel parameters in a fronthaul network, for example, a quantity of valid physical radio resource blocks (resource block, RB), a quantity of downlink data channel (for example, a physical downlink shared channel (physical downlink shared channel, PDSCH)) beams for each RB, a quantity of downlink data channel layers, a quantity of downlink control channel (for example, a physical downlink control channel (physical downlink control channel, PDCCH)) beams, a quantity of downlink control channel layers, a quantity of uplink data channel (for example, a physical uplink shared channel (physical uplink shared channel, PUSCH)) beams, a quantity of uplink data channel layers, a quantity of uplink control channel (for example, a physical uplink control channel (physical uplink control channel, PUCCH)) beams, a quantity of uplink control channel layers, and the like. Therefore, how to perform scheduling based on channel parameters to save a fronthaul bandwidth becomes an urgent problem to be resolved currently.

SUMMARY

This application provides a scheduling method, a parameter transmission method, an apparatus, a device, a system, and a medium, to save a fronthaul bandwidth. The technical solutions are as follows.

According to a first aspect, a scheduling method is provided. In the method, a first predicted transmission parameter of each of a plurality of cells is obtained, where the first predicted transmission parameter indicates a predicted transmission parameter required for each cell during scheduling in a current periodicity. The plurality of cells are cells included in a signal coverage area of an RU, and a maximum transmission bandwidth between the RU and a BU is less than a sum of maximum transmission bandwidths required by the plurality of cells. At least one of the plurality of cells is scheduled based on the first predicted transmission parameters of the plurality of cells.

It should be noted that the plurality of cells may be all cells in the signal coverage area of the RU, or may be some cells in the signal coverage area of the RU. In addition, the plurality of cells may be a plurality of cells that provide coverage for a base station, or may be all cells that share a same fronthaul bandwidth. This is not limited in this application.

In addition, the maximum transmission bandwidth between the RU and the BU is a maximum amount of data transmitted per unit of time by a fronthaul network between the RU and the BU. The maximum transmission bandwidth required by each cell refers to a maximum amount of data transmitted by each cell per unit of time through the fronthaul network when each cell reaches a peak load.

In this application, there are two manners in which the BU obtains the first predicted transmission parameter of each of the plurality of cells. The following separately describes the two manners.

In a first implementation, the RU predicts the transmission parameter required for each of the plurality of cells during scheduling in the current periodicity, to obtain the first predicted transmission parameter of each cell. The RU sends the first predicted transmission parameter of each of the plurality of cells to the BU. The BU receives the first predicted transmission parameter of each cell sent by the RU.

In a second implementation, the BU predicts the transmission parameter required for each of the plurality of cells during scheduling in the current periodicity, to obtain the first predicted transmission parameter of each cell.

In other words, in the first implementation, the transmission parameter required for each cell during scheduling in the current periodicity is predicted by the RU, and in the second implementation, the transmission parameter required for each cell during scheduling in the current periodicity is predicted by the BU.

Regardless of whether the RU or the BU predicts the transmission parameter required for each cell during scheduling in the current periodicity, prediction methods are the same. Therefore, in the foregoing two implementations, an implementation process of predicting the transmission parameter required for each of the plurality of cells during scheduling in the current periodicity includes: obtaining a second predicted transmission parameter and an actual transmission parameter of each of the plurality of cells, where the second predicted transmission parameter indicates a predicted transmission parameter required for each cell during scheduling in a previous periodicity, and the actual transmission parameter indicates a transmission parameter actually used for each cell during scheduling in the previous periodicity; and determining the first predicted transmission parameter of each cell based on the second predicted transmission parameter and the actual transmission parameter of each of the plurality of cells.

It should be noted that the plurality of cells may be cells of a same standard, or may be cells of different standards. When the plurality of cells are cells of different standards, the plurality of cells may include cells of two different standards, or may include cells of more than two standards. That is, the plurality of cells may include cells of at least two standards. The at least two standards may include LTE and NR, and may further include another standard. Optionally, the plurality of cells may have a same coverage area, or have different coverage areas.

The first predicted transmission parameter includes a predicted channel parameter or a predicted transmission bandwidth. The predicted channel parameter indicates a predicted physical channel parameter required for each cell during scheduling in the current periodicity. The predicted transmission bandwidth indicates a predicted transmission bandwidth required by each cell during scheduling in the current periodicity.

In some embodiments, the predicted channel parameter includes at least one of the following parameters: a quantity of downlink valid physical RBs, a quantity of downlink antennas, a quantity of uplink valid physical RBs, and a quantity of uplink antennas. That is, the predicted channel parameter includes at least one of the quantity of downlink valid physical RBs, the quantity of downlink antennas, the quantity of uplink valid physical RBs, and the quantity of uplink antennas.

In some other embodiments, the predicted channel parameter includes a quantity of user equipments of at least one of the following channels and resource information occupied by each user equipment: a downlink data channel, a downlink control channel, an uplink data channel, an uplink control channel, and a sounding reference channel. In other words, the predicted channel parameter includes the quantity of user equipments of at least one of the downlink data channel, the downlink control channel, the uplink data channel, the uplink control channel, and the sounding reference channel (for example, a channel configured to transmit the sounding reference signal (sounding reference signal, SRS)), and the resource information occupied by each user equipment.

For each of the downlink data channel, the downlink control channel, the uplink data channel, or the uplink control channel, the resource information occupied by each user equipment of the channel includes at least one of the following parameters: a quantity of RBs, a quantity of channel layers of each RB, and a quantity of channel physical antennas or a quantity of channel beams of each RB. For the sounding reference channel, the resource information occupied by each user equipment of the channel includes at least one of the following parameters: a quantity of RBs, a quantity of channel physical antennas of each RB, and a quantity of sounding reference signal symbols of each radio frame.

It should be noted that, specific parameters are included in the predicted channel parameter depends on respective functions of the BU and the RU. That is, specific parameters are included in the predicted channel parameter depends on functions implemented by the BU and functions implemented by the RU after division of functions of the fronthaul network between the BU and the RU. The predicted channel parameter varies with a division line.

Based on the foregoing description, the first predicted transmission parameter includes a predicted channel parameter or a predicted transmission bandwidth. In different cases, manners in which the BU schedules the at least one of the plurality of cells based on the first predicted transmission parameters of the plurality of cells are different. Therefore, the following separately describes the cases.

In a first case, the first predicted transmission parameter includes the predicted channel parameter. In this case, the BU may determine a schedulable channel parameter of the at least one cell based on the predicted channel parameters of the plurality of cells and a maximum allowable channel parameter of the RU. The BU schedules the at least one cell based on the schedulable channel parameter of the at least one cell.

The schedulable channel parameter of a cell is a maximum channel parameter that can be used for the cell during scheduling in the current periodicity. That is, a channel parameter actually used for the cell during scheduling in the current periodicity does not exceed the schedulable channel parameter.

Based on the foregoing description, the plurality of cells may be cells of a same standard, or may be cells of two different standards. In different cases, manners of determining the schedulable channel parameter of the at least one cell based on the predicted channel parameters of the plurality of cells and the maximum allowable channel parameter of the RU are different. Therefore, the following separately describes the cases.

Case 1: The plurality of cells are cells of a same standard. In this case, the BU may determine a sum of the predicted channel parameters of the plurality of cells, to obtain a total predicted channel parameter. If the total predicted channel parameter is greater than the maximum allowable channel parameter of the RU, the BU determines the schedulable channel parameter of the at least one cell based on the maximum allowable channel parameter of the RU and a ratio of the predicted channel parameter of each of the at least one cell to the total predicted channel parameter.

That is, in a case in which the total predicted channel parameter is greater than the maximum allowable channel parameter of the RU, for any cell of the at least one cell, a ratio of the predicted channel parameter of the cell to the total predicted channel parameter is determined, and the maximum allowable channel parameter of the RU is multiplied by the ratio, to obtain the schedulable channel parameter of the cell.

Optionally, if the total predicted channel parameter is less than or equal to the maximum allowable channel parameter of the RU, the predicted channel parameter of each cell is used as the schedulable channel parameter. That is, for the at least one cell, the predicted channel parameter of the at least one cell is used as a respective schedulable channel parameter.

In Case 1, for the plurality of cells of the same standard, the predicted channel parameter of each cell in the current periodicity is determined, and the schedulable channel parameter of each of the at least one cell is dynamically determined based on the maximum allowable channel parameter of the RU and the predicted channel parameter of each cell in the current periodicity, to schedule the at least one cell. That is, the plurality of cells share the maximum allowable channel parameter of the RU, and the schedulable channel parameter of each cell is determined as required, instead of based on the peak load that can be reached by each cell. In this way, when the plurality of cells do not simultaneously reach the peak load, the fronthaul bandwidth can be saved. In addition, it is proved by experiments that 20% of the fronthaul bandwidth can be saved in Case 1.

Case 2: The plurality of cells include cells of two different standards, which are a cell of a first standard and a cell of a second standard. In this case, the BU may determine a sum of predicted channel parameters of cells of a same standard in the plurality of cells, to obtain a total predicted channel parameter of the first standard and a total predicted channel parameter of the second standard. If a sum of the total predicted channel parameter of the first standard and the total predicted channel parameter of the second standard is greater than the maximum allowable channel parameter of the RU, a schedulable channel general parameter of the first standard and a schedulable channel general parameter of the second standard are determined based on the maximum allowable channel parameter of the RU. A schedulable channel parameter of each cell of the first standard in the at least one cell is determined based on the total schedulable channel parameter of the first standard and a ratio of a predicted channel parameter of each cell of the first standard in the at least one cell to the total predicted channel parameter of the first standard. A schedulable channel parameter of each cell of the second standard in the at least one cell is determined based on the total schedulable channel parameter of the second standard and a ratio of a predicted channel parameter of each cell of the second standard in the at least one cell to the total predicted channel parameter of the second standard.

As an example, an implementation process of determining the total schedulable channel parameter of the first standard and the total schedulable channel parameter of the second standard based on the maximum allowable channel parameter of the RU includes: subtracting the total predicted channel parameter of the first standard from the maximum allowable channel parameter of the RU to obtain the total schedulable channel parameter of the second standard, and using the total predicted channel parameter of the first standard as the total schedulable channel parameter of the first standard.

The total schedulable channel parameters of the first standard and the second standard may alternatively be determined in other manners. For example, the total predicted channel parameter of the second standard is subtracted from the maximum allowable channel parameter of the RU to obtain the schedulable channel general parameter of the first standard, and the total predicted channel parameter of the second standard is used as the schedulable channel general parameter of the second standard. For another example, the sum of the total predicted channel parameter of the first standard and the total predicted channel parameter of the second standard is determined to obtain total predicted channel parameters of all cells, a ratio of the total predicted channel parameter of the first standard to the total predicted channel parameters of all cells is determined. The ratio is multiplied by the maximum allowable channel parameter of the RU to obtain the total schedulable channel parameter of the first standard. A ratio of the total predicted channel parameter of the second standard to the total predicted channel parameters of all the cells is determined. The ratio is multiplied by the maximum allowable channel parameter of the RU to obtain the total schedulable channel parameter of the second standard.

Optionally, if the sum of the total predicted channel parameter of the first standard and the total predicted channel parameter of the second standard is less than or equal to the maximum allowable channel parameter of the RU, the predicted channel parameter of each cell is used as the schedulable channel parameter. That is, for the at least one cell, the predicted channel parameter of the at least one cell is used as the respective schedulable channel parameter.

In Case 2, for the cells of two different standards, the predicted channel parameter of each cell in the current periodicity is determined, and total schedulable channel parameters of the two standards are dynamically determined based on the maximum allowable channel parameter of the RU and the predicted channel parameter of each cell in the current periodicity, so that the schedulable channel parameter of each of the at least one cell is dynamically determined, to schedule the at least one cell. That is, the two standards share the maximum allowable channel parameter of the RU, and the total schedulable channel parameter of the two standards is determined as required, so that the schedulable channel parameter of each cell is determined as required, instead of based on the peak load that can be reached by each cell. In this way, when the plurality of cells do not simultaneously reach the peak load, the fronthaul bandwidth can be saved. In addition, it is proved by experiments that, in a case in which the two standards occupy a same spectrum bandwidth and have same channel parameters, 50% of the fronthaul bandwidth can be saved in Case 2.

In a second case, the first predicted transmission parameter includes the predicted transmission bandwidth. In this case, the BU may determine the predicted channel parameters of the plurality of cells based on the predicted transmission bandwidths of the plurality of cells, and determine the schedulable channel parameter of the at least one cell based on the predicted channel parameters of the plurality of cells and the maximum allowable channel parameter of the RU. The BU schedules the at least one cell based on the schedulable channel parameter of the at least one cell.

According to a second aspect, a parameter transmission method is provided. In the method, a transmission parameter required for each of a plurality of cells during scheduling in a current periodicity is predicted, to obtain a first predicted transmission parameter of each cell. The first predicted transmission parameter of each cell is sent to a baseband unit BU, where the plurality of cells are cells included in a signal coverage area of a radio unit RU, and a maximum transmission bandwidth between the RU and the BU is less than a sum of maximum transmission bandwidths required by the plurality of cells.

Optionally, that a transmission parameter required for each of a plurality of cells during scheduling in a current periodicity is predicted, to obtain a first predicted transmission parameter of each cell includes:

- obtaining a second predicted transmission parameter and an actual transmission parameter of each cell, where the second predicted transmission parameter indicates a predicted transmission parameter required for each cell during scheduling in a previous periodicity, and the actual transmission parameter indicates a transmission parameter actually used for each cell during scheduling in the previous periodicity; and
- determining the first predicted transmission parameter of each cell based on the second predicted transmission parameter and the actual transmission parameter of each cell.

Optionally, the first predicted transmission parameter includes a predicted channel parameter or a predicted transmission bandwidth, and the predicted channel parameter indicates a predicted physical channel parameter required for each cell during scheduling in the current periodicity.

Optionally, the predicted channel parameter includes at least one of the following parameters: a quantity of downlink valid physical radio resource blocks RBs, a quantity of downlink antennas, a quantity of uplink valid physical RBs, and a quantity of uplink antennas.

Optionally, the predicted channel parameter includes a quantity of user equipments of at least one of the following channels and resource information occupied by each user equipment: a downlink data channel, a downlink control channel, an uplink data channel, an uplink control channel, and a sounding reference channel.

Optionally, the resource information occupied by each user equipment of each of the downlink data channel, the downlink control channel, the uplink data channel, or the uplink control channel includes at least one of the following parameters: a quantity of RBs, a quantity of channel layers of each RB, and a quantity of channel physical antennas or a quantity of channel beams of each RB.

The resource information occupied by each user equipment of the sounding reference channel includes at least one of the following parameters: a quantity of RBs, a quantity of channel physical antennas of each RB, and a quantity of sounding reference signal symbols of each radio frame.

Optionally, the plurality of cells are cells of a same standard, or the plurality of cells include cells of two different standards.

Optionally, the two different standards include long term evolution LTE and new radio NR.

Optionally, the plurality of cells have a same coverage area.

According to a third aspect, a scheduling apparatus is provided. The scheduling apparatus has a function of implementing behavior of the scheduling method in the first aspect. The scheduling apparatus includes at least one module, and the at least one module is configured to implement the scheduling method provided in the first aspect.

That is, the scheduling apparatus includes:

an obtaining module, configured to obtain a first predicted transmission parameter of each of a plurality of cells, where the first predicted transmission parameter indicates a predicted transmission parameter required for each cell during scheduling in a current periodicity, where the plurality of cells are cells included in a signal coverage area of a radio unit RU, and a maximum transmission bandwidth between the RU and a baseband unit BU is less than a sum of maximum transmission bandwidths required by the plurality of cells; and a scheduling module, configured to schedule at least one of the plurality of cells based on the first predicted transmission parameters of the plurality of cells.

Optionally, the obtaining module includes:

a receiving submodule, configured to receive the first predicted transmission parameter of each cell sent by the RU.

Optionally, the obtaining module includes:

a prediction submodule, configured to predict the transmission parameter required for each cell during scheduling in the current periodicity, to obtain the first predicted transmission parameter of each cell.

Optionally, the prediction submodule is specifically configured to:

obtain a second predicted transmission parameter and an actual transmission parameter of each cell, where the second predicted transmission parameter indicates a predicted transmission parameter required for each cell during scheduling in a previous periodicity, and the actual transmission parameter indicates a transmission parameter actually used for each cell during scheduling in the previous periodicity; and determine the first predicted transmission parameter of each cell based on the second predicted transmission parameter and the actual transmission parameter of each cell.

Optionally, the first predicted transmission parameter includes a predicted channel parameter, and the predicted channel parameter indicates a predicted physical channel parameter required for each cell during scheduling in the current periodicity.

The scheduling module includes:

a schedulable parameter determining submodule, configured to determine a schedulable channel parameter of the at least one cell based on the predicted channel parameters of the plurality of cells and a maximum allowable channel parameter of the RU; and a scheduling submodule, configured to schedule the at least one cell based on the schedulable channel parameter of the at least one cell.

Optionally, the first predicted transmission parameter includes a predicted transmission bandwidth.

The scheduling module includes:

a predicted channel parameter determining submodule, configured to determine a predicted channel parameter of each cell based on the predicted transmission bandwidths of the plurality of cells, where the predicted channel parameter indicates a predicted physical channel parameter required for each cell during scheduling in the current periodicity;

a schedulable parameter determining submodule, configured to determine a schedulable channel parameter of the at least one cell based on the predicted channel parameters of the plurality of cells and a maximum allowable channel parameter of the RU; and a scheduling submodule, configured to schedule the at least one cell based on the schedulable channel parameter of the at least one cell.

Optionally, the plurality of cells are cells of a same standard.

The schedulable parameter determining submodule is specifically configured to:

determine a sum of the predicted channel parameters of the plurality of cells, to obtain a total predicted channel parameter; and if the total predicted channel parameter is greater than the maximum allowable channel parameter, determine the schedulable channel parameter of the at least one cell based on the maximum allowable channel parameter and a ratio of the predicted channel parameter of each of the at least one cell to the total predicted channel parameter.

Optionally, the plurality of cells include cells of two different standards, which are a cell of a first standard and a cell of a second standard.

The schedulable parameter determining submodule is specifically configured to:

determine a sum of predicted channel parameters of cells of a same standard in the plurality of cells to obtain a total predicted channel parameter of the first standard and a total predicted channel parameter of the second standard;

if a sum of the total predicted channel parameter of the first standard and the total predicted channel parameter of the second standard is greater than the maximum allowable channel parameter, determine a total schedulable channel parameter of the first standard and a total schedulable channel parameter of the second standard based on the maximum allowable channel parameter;

determine a schedulable channel parameter of each cell of the first standard in the at least one cell based on the total schedulable channel parameter of the first standard and a ratio of a predicted channel parameter of each cell of the first standard in the at least one cell to the total predicted channel parameter of the first standard; and determine a schedulable channel parameter of each cell of the second standard in the at least one cell based on the total schedulable channel parameter of the second standard and a ratio of a predicted channel parameter of each cell of the second standard in the at least one cell to the total predicted channel parameter of the second standard.

Optionally, the predicted channel parameter includes at least one of the following parameters: a quantity of downlink valid physical radio resource blocks RBs, a quantity of downlink antennas, a quantity of uplink valid physical RBs, and a quantity of uplink antennas.

Optionally, the predicted channel parameter includes a quantity of user equipments of at least one of the following channels and resource information occupied by each user equipment: a downlink data channel, a downlink control channel, an uplink data channel, an uplink control channel, and a sounding reference channel.

Optionally, the resource information occupied by each user equipment of each of the downlink data channel, the downlink control channel, the uplink data channel, or the uplink control channel includes at least one of the following parameters: a quantity of RBs, a quantity of channel layers of each RB, and a quantity of channel physical antennas or a quantity of channel beams of each RB.

The resource information occupied by each user equipment of the sounding reference channel includes at least one of the following parameters: a quantity of RBs, a quantity of channel physical antennas of each RB, and a quantity of sounding reference signal symbols of each radio frame.

Optionally, the two different standards include long term evolution LTE and new radio NR.

Optionally, the plurality of cells have a same coverage area.

According to a fourth aspect, a parameter transmission apparatus is provided. The parameter transmission apparatus has a function of implementing behavior of the parameter transmission method in the first aspect. The parameter transmission apparatus includes at least one module, and the at least one module is configured to implement the parameter transmission method provided in the second aspect.

That is, the parameter transmission apparatus includes:

- a parameter prediction module, configured to predict a transmission parameter required for each of a plurality of cells during scheduling in a current periodicity, to obtain a first predicted transmission parameter of each cell; and
- a sending module, configured to send the first predicted transmission parameter of each cell to a baseband unit BU, where
- the plurality of cells are cells included in a signal coverage area of a radio unit RU, and a maximum transmission bandwidth between the RU and the BU is less than a sum of maximum transmission bandwidths required for the plurality of cells.

Optionally, the parameter prediction module is specifically configured to:

- obtain a second predicted transmission parameter and an actual transmission parameter of each cell, where the second predicted transmission parameter indicates a predicted transmission parameter required for each cell during scheduling in a previous periodicity, and the actual transmission parameter indicates a transmission parameter actually used for each cell during scheduling in the previous periodicity; and
- determine the first predicted transmission parameter of each cell based on the second predicted transmission parameter and the actual transmission parameter of each cell.

Optionally, the first predicted transmission parameter includes a predicted channel parameter or a predicted transmission bandwidth, and the predicted channel parameter indicates a predicted physical channel parameter required for each cell during scheduling in the current periodicity.

Optionally, the predicted channel parameter includes at least one of the following parameters: a quantity of downlink valid physical radio resource blocks RBs, a quantity of downlink antennas, a quantity of uplink valid physical RBs, and a quantity of uplink antennas.

Optionally, the predicted channel parameter includes a quantity of user equipments of at least one of the following channels and resource information occupied by each user equipment: a downlink data channel, a downlink control channel, an uplink data channel, an uplink control channel, and a sounding reference channel.

Optionally, the resource information occupied by each user equipment of each of the downlink data channel, the downlink control channel, the uplink data channel, or the uplink control channel includes at least one of the following parameters: a quantity of RBs, a quantity of channel layers of each RB, and a quantity of channel physical antennas or a quantity of channel beams of each RB.

The resource information occupied by each user equipment of the sounding reference channel includes at least one of the following parameters: a quantity of RBs, a quantity of channel physical antennas of each RB, and a quantity of sounding reference signal symbols of each radio frame.

Optionally, the plurality of cells are cells of a same standard, or the plurality of cells include cells of two different standards.

Optionally, the two different standards include long term evolution LTE and new radio NR.

Optionally, the plurality of cells have a same coverage area.

According to a fifth aspect, a BU is provided, where the BU includes a processor and a memory, and the memory is configured to store a computer program for performing the scheduling method provided in the first aspect. The processor is configured to execute the computer program stored in the memory, to implement the scheduling method according to the first aspect.

Optionally, the BU may further include a communication bus. The communication bus is configured to establish a connection between the processor and the memory.

According to a sixth aspect, an RU is provided, where the RU includes a processor and a memory, and the memory is configured to store a computer program for performing the parameter transmission method provided in the first aspect. The processor is configured to execute the computer program stored in the memory, to implement the parameter transmission method according to the first aspect.

Optionally, the RU may further include a communication bus. The communication bus is configured to establish a connection between the processor and the memory.

According to a seventh aspect, a scheduling system is provided. The system includes an RU and a BU.

The RU is configured to predict a transmission parameter required for each cell of a plurality of cells during scheduling in a current periodicity, to obtain a first predicted transmission parameter of each cell, and send the first predicted transmission parameter of each cell to the BU.

The BU is configured to receive the first predicted transmission parameter of each cell sent by the RU, and schedule at least one of the plurality of cells based on the first predicted transmission parameters of the plurality of cells.

The plurality of cells are cells included in a signal coverage area of a radio unit RU, and a maximum transmission bandwidth between the RU and a baseband unit BU is less than a sum of the maximum transmission bandwidths required by the plurality of cells.

According to an eighth aspect, a computer-readable storage medium is provided. The storage medium stores instructions. When the instructions are run on a computer, the computer is enabled to perform the steps of the scheduling method according to the first aspect, or perform the steps of the parameter transmission method according to the second aspect.

According to a ninth aspect, a computer program product including instructions is provided. When the instructions are run on a computer, the computer is enabled to perform the steps of the scheduling method according to the first aspect, or perform the steps of the parameter transmission method according to the second aspect.

In other words, a computer program is provided. When the computer program is run on a computer, the computer is enabled to perform the steps of the scheduling method according to the first aspect, or perform the steps of the parameter transmission method according to the second aspect.

Technical effects obtained in the second aspect to the ninth aspect are similar to technical effects obtained by using corresponding technical means in the first aspect. Details are not described herein again.

The technical solutions provided in this application can bring at least the following beneficial effects.

The maximum transmission bandwidth required by each cell refers to a maximum amount of data transmitted by each cell per unit of time through a fronthaul network when each cell reaches the peak load. However, it is impossible that all cells simultaneously reach the peak load. Therefore, in this application, a first predicted transmission parameter of each of the plurality of cells is obtained, and at least one of the plurality of cells is scheduled based on the first predicted transmission parameters of the plurality of cells. The channel parameter required for the at least one cell is not determined based on the peak load that can be reached by each cell, to schedule the at least one cell. In this way, it can be ensured that a maximum transmission bandwidth between the RU and the BU is less than a sum of maximum transmission bandwidths required by the plurality of cells, so that a fronthaul bandwidth can be saved when the plurality of cells do not simultaneously reach the peak load.

BRIEF DESCRIPTION OF DRAWINGS

FIG. 8 is another schematic diagram of function division of a BU and an RU according to an embodiment of this application;

FIG. 9 is a schematic diagram of a single-standard cell according to an embodiment of this application;

FIG. 10 is a schematic diagram of a multi-standard cell according to an embodiment of this application;

DESCRIPTION OF EMBODIMENTS

To make objectives, technical solutions, and advantages of embodiments of this application clearer, the following further describes implementations of this application in detail with reference to the accompanying drawings.

Figure 1:
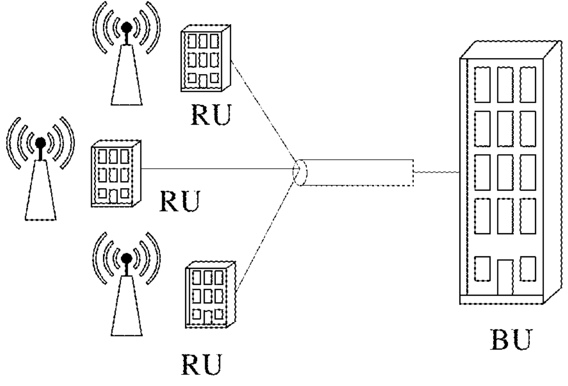
FIG. 1 is a schematic diagram of a system architecture according to an embodiment of this application.
Figure 2:
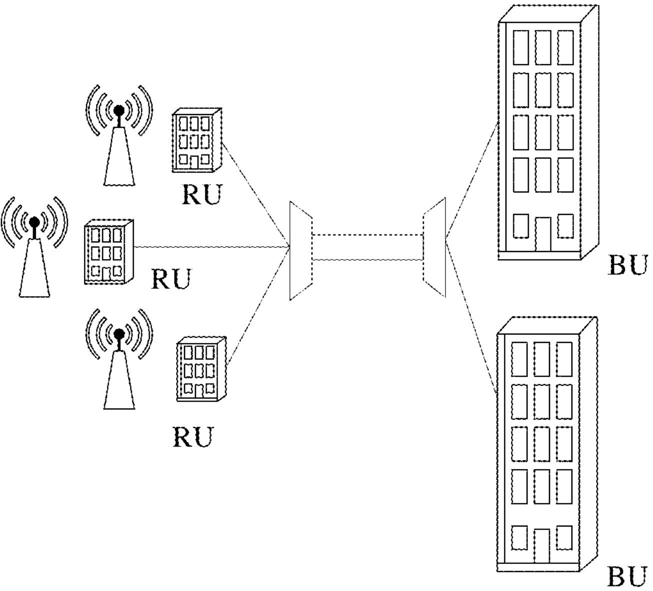
FIG. 2 is a schematic diagram of another system architecture according to an embodiment of this application.

Refer to FIG. 1. FIG. 1 is a schematic diagram of a system architecture according to an embodiment of this application. The system architecture includes a baseband unit (baseband unit, BU) and a plurality of radio units (radio unit, RU). The BU is connected to the plurality of RUs through optical fibers for communication. Refer to FIG. 2. FIG. 2 is a schematic diagram of another system architecture according to an embodiment of this application. The system architecture includes a plurality of BUs and a plurality of RUs, and the plurality of BUs are connected to the plurality of RUs through optical fibers for communication. In other words, in embodiments of this application, one BU may be connected to a plurality of RUs, or a plurality of BUs may be connected to a plurality of RUs.

Figure 3:
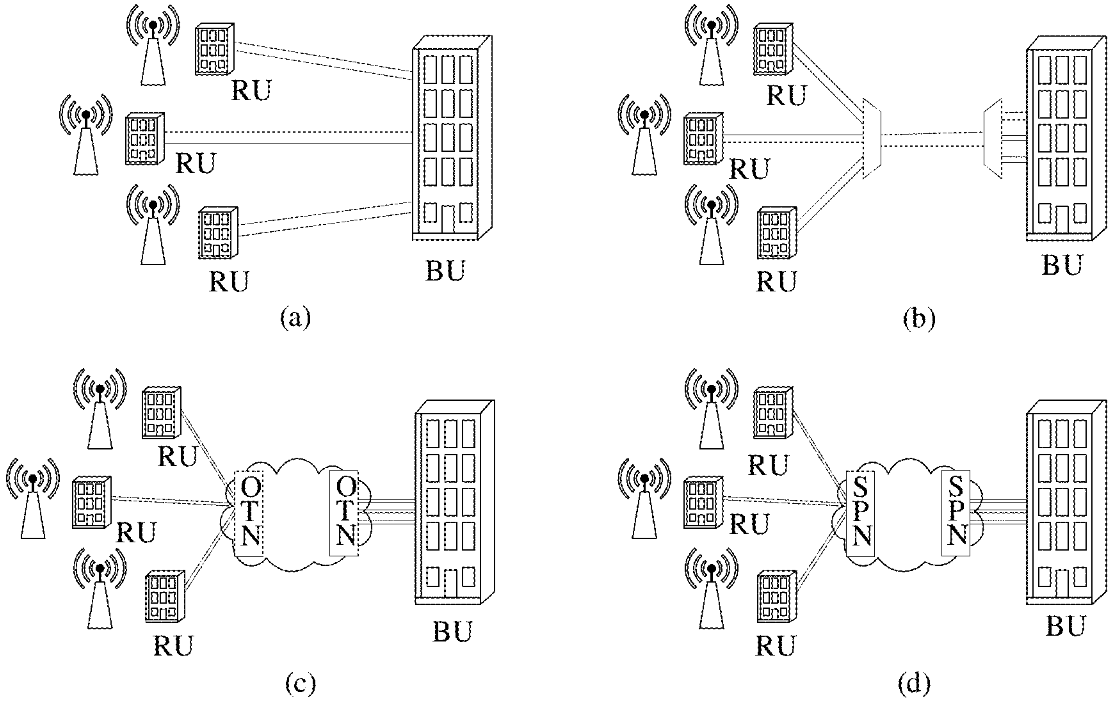
FIG. 3 is a schematic diagram of a plurality of networking forms according to an embodiment of this application.

A network between the BU and the RU is referred to as a fronthaul network. There are a plurality of networking forms between the BU and the plurality of RUs. Refer to FIG. 3. FIG. 3 shows four networking forms. In a networking form (a) of FIG. 3, a BU and an RU communicate with each other through optical fibers. In a networking form (b) of FIG. 3, the BU communicates with the RU in a passive wavelength division multiplexing (wavelength division multiplexing, WDM) mode. In a networking form (c) of FIG. 3, the BU communicates with the RU in an active WDM mode or an optical transport network (optical transport network, OTN) mode. In a networking form (d) of FIG. 3, the BU communicates with the RU in a secret private network (secret private network, SPN) mode.

Figure 4:
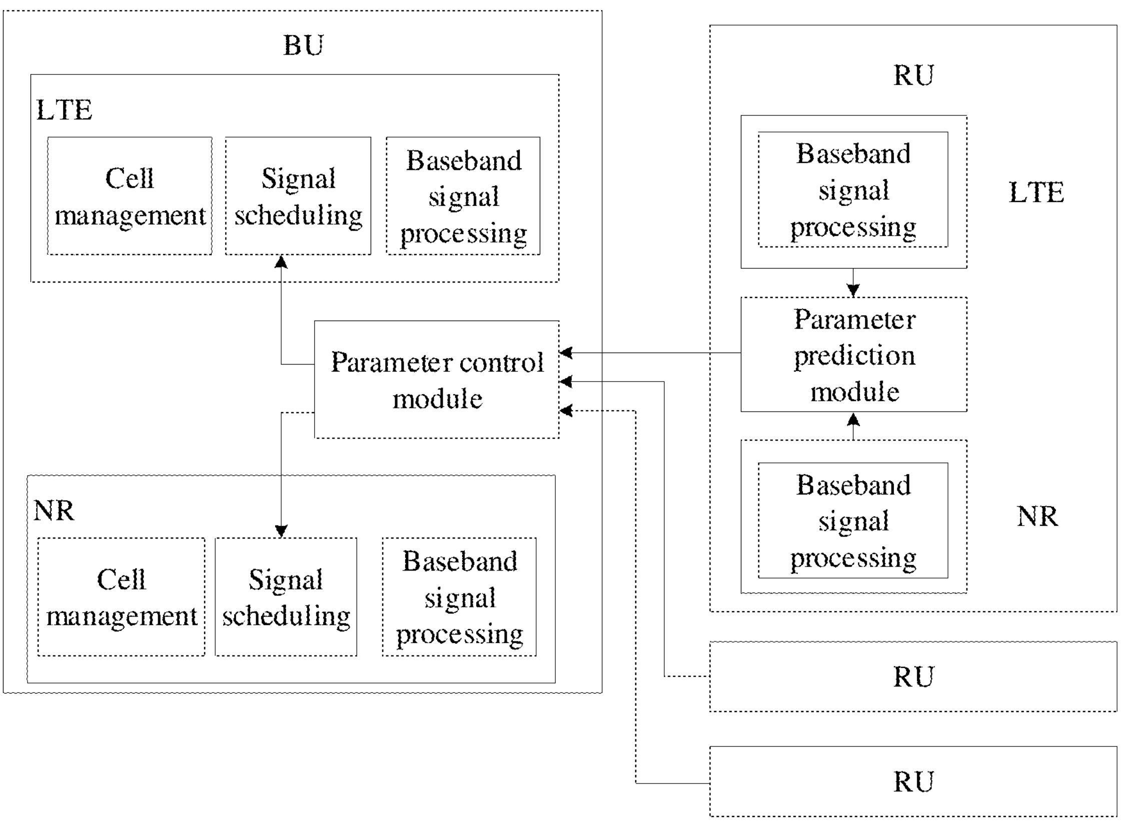
FIG. 4 is a system block diagram of a BU and an RU according to an embodiment of this application.

Regardless of which networking form is used, data is transmitted between the BU and the RU through a transmission medium, for example, an optical fiber. The costs of optical fiber deployment are high. Therefore, the fronthaul bandwidth becomes a valuable resource. To save the fronthaul bandwidth, the BU and the RU are improved in embodiments of this application. Refer to FIG. 4. FIG. 4 is a system block diagram of a BU and an RU according to an embodiment of this application. The BU may include a long term evolution (long term evolution, LTE) module, a new radio (new radio, NR) module, and a parameter control module. Both the LTE module and the NR module include a cell management unit, a channel scheduling unit, and a baseband signal processing unit. The RU may include the LTE module, the NR module, and a parameter prediction module. Optionally, both the LTE module and the NR module in the RU may include a baseband signal processing unit.

For the RU, the parameter prediction module is configured to predict a transmission parameter required for each cell in the LTE during scheduling, and is further configured to predict a transmission parameter required for each cell in the NR during scheduling, to obtain a predicted transmission parameter of each cell, and send the predicted transmission parameter of each cell to the BU.

For the BU, the parameter control module is configured to schedule at least one cell based on the predicted transmission parameter of each cell in the LTE and the predicted transmission parameter of each cell in the NR.

It should be noted that the BU and the RU may support one standard, or may support a plurality of standards. For example, FIG. 4 is described by using an example in which the BU and the RU support two standards. Optionally, the BU includes a building baseband unit (building baseband unit, BBU), and the RU includes a remote radio unit (remote radio unit, RRU). Alternatively, the BU includes a distributed unit (distributed unit, DU) or a central unit (central unit, CU), and the RU includes an active antenna unit (active antenna unit, AAU). In addition, with development of technologies and evolution of a system architecture, a network of another standard may further appear. In this case, the BU and the RU may be divided or named in another manner. In other words, the system architecture described in embodiments of this application is intended to describe the technical solutions in embodiments of this application more clearly, and does not constitute any limitation on the technical solutions provided in embodiments of this application. With evolution of the system architecture, the technical solutions provided in embodiments of this application are also applicable to a similar technical problem.

Figure 5:
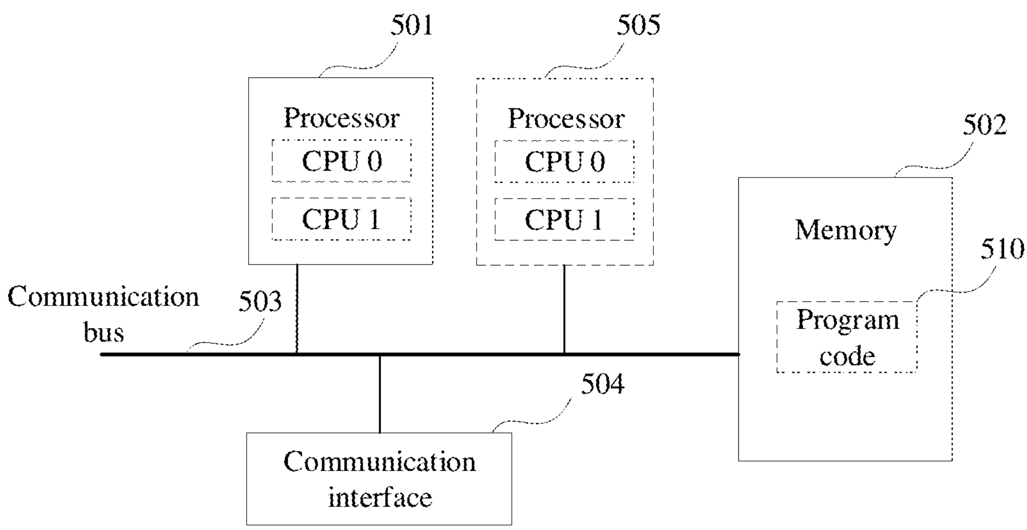
FIG. 5 is a schematic diagram of a structure of a network device according to an embodiment of this application.

Refer to FIG. 5. FIG. 5 is a schematic diagram of a structure of a network device according to an embodiment of this application. The network device may be the BU or the RU shown in FIG. 1 or FIG. 2. The network device includes a processor 501 and a memory 502.

The processor 501 may be a general-purpose central processing unit (central processing unit, CPU), a network processor (network processor, NP), a microprocessor, or may be one or more integrated circuits configured to implement solutions of this application, for example, an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 502 may be but is not limited to a read-only memory (read-only memory, ROM), a random access memory (random access memory, RAM), an electrically erasable programmable read-only memory (electrically erasable programmable read-only memory, EEPROM), an optical disc (including a compact disc read-only memory (compact disc read-only memory, CD-ROM), a compact disc, a laser disc, a digital versatile disc, a Blu-ray disc, or the like), a magnetic disk storage medium or another magnetic storage device, or any other medium capable of carrying or storing expected program code in a form of instructions or a data structure and capable of being accessed by a computer. The memory 502 may exist independently, and is connected to the processor 501. The memory 502 and the processor 501 may be integrated together.

Optionally, the network device may further include a communication bus 503 and at least one communication interface 504. The communication bus 503 is configured to transmit information between the foregoing components. The communication bus 503 may be classified into an address bus, a data bus, a control bus, or the like. For ease of representation, only one bold line is used to represent the bus in the figure, but this does not mean that there is only one bus or only one type of bus.

The communication interface 504 uses any apparatus such as a transceiver, and is configured to communicate with another device or a communication network. The communication interface 504 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (wireless local area network, WLAN) interface, a cellular network communication interface, or a combination thereof.

Optionally, in an embodiment, the processor 501 may include one or more CPUs, for example, a CPU 0 and a CPU 1 shown in FIG. 5.

Optionally, in an embodiment, the network device may include a plurality of processors, for example, a processor 501 and a processor 505 shown in FIG. 5. Each of the processors may be a single-core processor, or may be a multi-core processor. The processor herein may be one or more devices, circuits, and/or processing cores configured to process data (for example, computer program instructions).

In some embodiments, the memory 502 is configured to store program code 510 for executing embodiments of this application, and the processor 501 may execute the program code 510 stored in the memory 502. The program code 510 may include one or more software modules. The network device may implement the method provided in the following embodiments of FIG. 6 through the processor 501 and the program code 510 in the memory 502.

Figure 6:
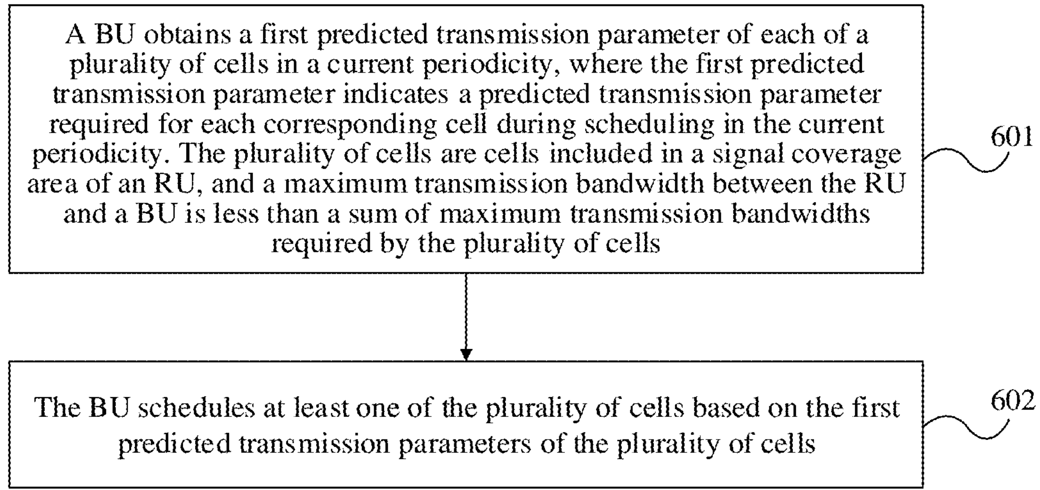
FIG. 6 is a flowchart of a scheduling method according to an embodiment of this application.

FIG. 6 is a flowchart of a scheduling method according to an embodiment of this application. Refer to FIG. 6. The method includes the following steps.

Step 601: A BU obtains a first predicted transmission parameter of each of a plurality of cells, where the first predicted transmission parameter indicates a predicted transmission parameter required for each cell during scheduling in a current periodicity. The plurality of cells are cells included in a signal coverage area of an RU, and a maximum transmission bandwidth between the RU and the BU is less than a sum of maximum transmission bandwidths required by the plurality of cells.

It should be noted that the plurality of cells may be all cells in the signal coverage area of the RU, or may be some cells in the signal coverage area of the RU. In addition, the plurality of cells may be a plurality of cells that provide coverage for a base station, or may be all cells that share a same fronthaul bandwidth. This is not limited in this embodiment of this application.

In addition, the maximum transmission bandwidth between the RU and the BU is a maximum amount of data transmitted per unit of time by a fronthaul network between the RU and the BU. The maximum transmission bandwidth required by each cell refers to a maximum amount of data transmitted by each cell per unit of time through the fronthaul network when each cell reaches a peak load.

In this embodiment of this application, there are two manners in which the BU obtains the first predicted transmission parameter of each of the plurality of cells. The following separately describes the two manners.

In a first implementation, the RU predicts the transmission parameter required for each of the plurality of cells during scheduling in the current periodicity, to obtain the first predicted transmission parameter of each cell. The RU sends the first predicted transmission parameter of each of the plurality of cells to the BU. The BU receives the first predicted transmission parameter of each cell sent by the RU.

In a second implementation, the BU predicts the transmission parameter required for each of the plurality of cells during scheduling in the current periodicity, to obtain the first predicted transmission parameter of each cell.

In other words, in the first implementation, the transmission parameter required for each cell during scheduling in the current periodicity is predicted by the RU, and in the second implementation, the transmission parameter required for each cell during scheduling in the current periodicity is predicted by the BU.

Regardless of whether the RU or the BU predicts the transmission parameter required for each cell during scheduling in the current periodicity, prediction methods are the same. Therefore, in the foregoing two implementations, an implementation process of predicting the transmission parameter required for each of the plurality of cells during scheduling in the current periodicity includes: obtaining a second predicted transmission parameter and an actual transmission parameter of each of the plurality of cells, where the second predicted transmission parameter indicates a predicted transmission parameter required for each cell during scheduling in a previous periodicity, and the actual transmission parameter indicates a transmission parameter actually used for each cell during scheduling in the previous periodicity; and determining the first predicted transmission parameter of each cell based on the second predicted transmission parameter and the actual transmission parameter of each of the plurality of cells.

In an example, the first predicted transmission parameter of each of the plurality of cells is determined based on the second predicted transmission parameter and the actual transmission parameter of each of the plurality of cells and according to the following formula (1).

$$CPredict_k = CPredict_{k-1} + \alpha(CUse_{k-1} - CPredict_{k-1}) \quad (1)$$

In the foregoing formula (1), $CPredict_k$ is a first predicted transmission parameter of a cell in the plurality of cells. $CPredict_{k-1}$ is a second predicted transmission parameter of the cell. $\alpha$ is a filtering coefficient, which is a known parameter. $CUse_{k-1}$ is an actual transmission parameter of the cell, that is, a transmission parameter actually used by the cell during scheduling in the previous periodicity.

It should be noted that the second predicted transmission parameter may be obtained by prediction before scheduling in the previous periodicity, and the actual transmission parameter may be determined after scheduling in the previous periodicity is completed. Similarly, the first predicted transmission parameter may be obtained by prediction before scheduling in the current periodicity. A specific time point at which prediction is performed is not limited in this application.

A periodicity duration is set in advance, and may be adjusted according to an actual requirement. For example, the periodicity duration may be 20 ms, 10 ms, 5 ms, 1 ms, or the like. In addition, for a first periodicity, the maximum allowable transmission parameter of the RU may be equally divided based on a quantity of the plurality of cells, to predict and obtain a transmission parameter required for each cell during scheduling in the first periodicity.

The plurality of cells may be cells of a same standard, or may be cells of different standards. When the plurality of cells are cells of different standards, the plurality of cells may include cells of two different standards, and may also include cells of more than two standards. That is, the plurality of cells may include cells of at least two standards. The at least two standards may include LTE and NR, and may further include another standard.

Optionally, the plurality of cells may have a same coverage area. In addition, the plurality of cells may alternatively have different coverage areas.

The first predicted transmission parameter includes a predicted channel parameter or a predicted transmission bandwidth. The predicted channel parameter indicates a predicted physical channel parameter required for each cell during scheduling in the current periodicity. The predicted transmission bandwidth indicates a predicted transmission bandwidth required by each cell during scheduling in the current periodicity.

In some embodiments, the predicted channel parameter includes at least one of the following parameters: a quantity of downlink valid physical RBs, a quantity of downlink antennas, a quantity of uplink valid physical RBs, and a quantity of uplink antennas. That is, the predicted channel parameter includes at least one of a quantity of downlink valid physical RBs, a quantity of downlink antennas, a quantity of uplink valid physical RBs, and a quantity of uplink antennas.

In some other embodiments, the predicted channel parameter includes a quantity of user equipments of at least one of the following channels and resource information occupied by each user equipment: a downlink data channel, a downlink control channel, an uplink data channel, an uplink control channel, and a sounding reference channel. In other words, the predicted channel parameter may include the quantity of user equipments of at least one of the downlink data channel, the downlink control channel, the uplink data channel, the uplink control channel, and the sounding reference channel, and the resource information occupied by each user equipment.

For each of the downlink data channel, the downlink control channel, the uplink data channel, or the uplink control channel, the resource information occupied by each user equipment of the channel includes at least one of the following parameters: a quantity of RBs, a quantity of channel layers of each RB, and a quantity of channel physical antennas or a quantity of channel beams of each RB. For the sounding reference channel, the resource information occupied by each user equipment of the channel includes at least one of the following parameters: a quantity of RBs, a quantity of channel physical antennas of each RB, and a quantity of sounding reference signal symbols of each radio frame.

It should be noted that, specific parameters are included in the predicted channel parameter depends on respective functions of the BU and the RU. That is, specific parameters are included in the predicted channel parameter depends on functions implemented by the BU and functions implemented by the RU after division of functions of the fronthaul network between the BU and the RU. The predicted channel parameter varies with a division line.

Figure 7:
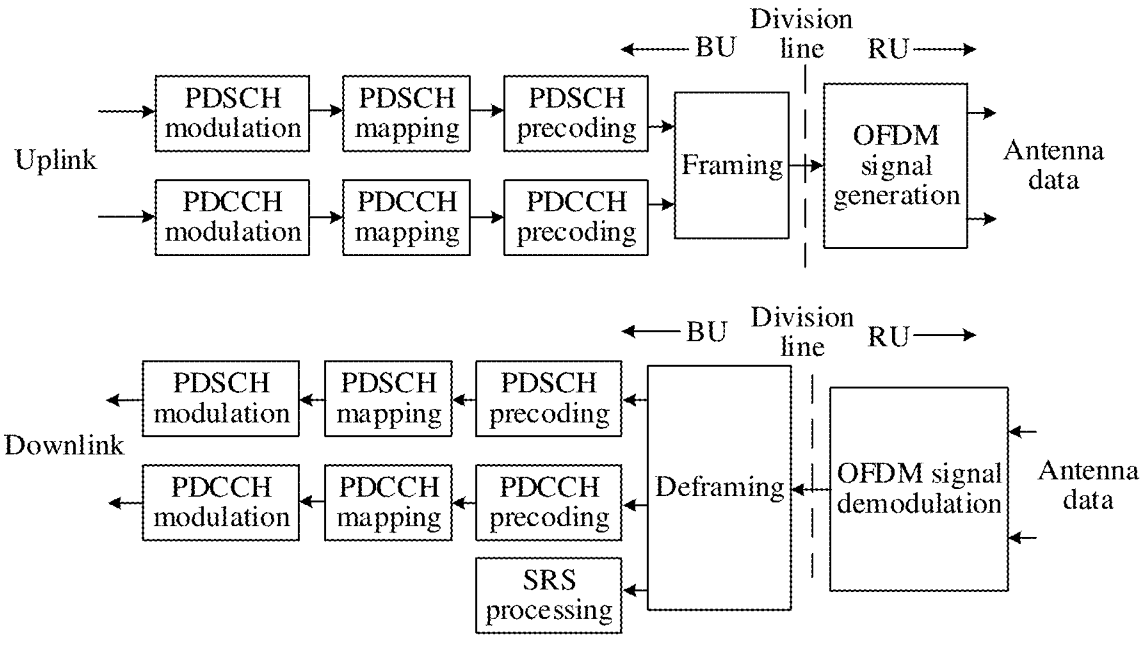
FIG. 7 is a schematic diagram of function division of a BU and an RU according to an embodiment of this application.

For example, refer to FIG. 7. FIG. 7 shows function division separated by using the division line. For uplink data, the functions of the BU include PDSCH modulation, PDCCH modulation, PDSCH mapping, PDCCH mapping, PDSCH precoding, PDCCH precoding, and framing; and the functions of the RU include orthogonal frequency division multiplexing (orthogonal frequency division multiplexing, OFDM) signal generation. For downlink data, the functions of the RU include OFDM signal demodulation; and the functions of the BU include deframing, PUSCH channel estimation, PUCCH channel estimation, SRS processing, PUSCH demodulation, PUCCH demodulation, PUSCH decoding, and PUCCH decoding. In this case, the predicted channel parameter includes at least one of a quantity of downlink valid physical RBs, a quantity of downlink antennas, a quantity of uplink valid physical RBs, and a quantity of uplink antennas.

For another example, refer to FIG. 8. FIG. 8 shows function division separated by using the division line. For uplink data, the functions of the BU include PDSCH modulation and PDCCH modulation; and the functions of the RU include PDSCH mapping, PDCCH mapping, PDSCH precoding, PDCCH precoding, framing, and OFDM signal generation. For downlink data, the functions of the RU include OFDM signal demodulation, deframing, PUSCH channel estimation, PUCCH channel estimation, SRS processing, PUSCH demodulation, PUCCH demodulation; and the functions of the BU include PUSCH decoding and PUCCH decoding. In this case, the predicted channel parameter may include a quantity of user equipments of at least one of a PDSCH, a PDCCH, a PUSCH, a PUCCH, and a channel configured to transmit an SRS, and resource information occupied by each user equipment.

It should be noted that FIG. 7 and FIG. 8 are merely two examples of function division of the BU and the RU shown in embodiments of this application. Embodiments of this application may be further applied to another scenario of the function division of the BU and the RU. The function division of the BU and the RU is not limited in embodiments of this application.

Step 602: The BU schedules at least one of the plurality of cells based on the first predicted transmission parameters of the plurality of cells.

Based on the foregoing description, the first predicted transmission parameter includes a predicted channel parameter or a predicted transmission bandwidth. In different cases, manners in which the BU schedules the at least one of the plurality of cells based on the first predicted transmission parameters of the plurality of cells are different. Therefore, the following separately describes the cases.

In a first case, the first predicted transmission parameter includes the predicted channel parameter. In this case, the BU may determine a schedulable channel parameter of the at least one cell based on the predicted channel parameters of the plurality of cells and a maximum allowable channel parameter of the RU. The BU schedules the at least one cell based on the schedulable channel parameter of the at least one cell.

The schedulable channel parameter of a cell is a maximum channel parameter that can be used for the cell during scheduling in the current periodicity. That is, a channel parameter actually used by the cell during scheduling in the current periodicity does not exceed the schedulable channel parameter.

Based on the foregoing description, the plurality of cells may be cells of a same standard, or may be cells of two different standards. In different cases, manners of determining the schedulable channel parameter of the at least one cell based on the predicted channel parameters of the plurality of cells and the maximum allowable channel parameter of the RU are different. Therefore, the following separately describes the cases.

Case 1: The plurality of cells are cells of a same standard. In this case, the BU may determine a sum of the predicted channel parameters of the plurality of cells, to obtain a total predicted channel parameter. If the total predicted channel parameter is greater than the maximum allowable channel parameter of the RU, the BU determines the schedulable channel parameter of the at least one cell based on the maximum allowable channel parameter of the RU and a ratio of the predicted channel parameter of each of the at least one cell to the total predicted channel parameter.

That is, in a case in which the total predicted channel parameter is greater than the maximum allowable channel parameter of the RU, for any cell of the at least one cell, a ratio of the predicted channel parameter of the cell to the total predicted channel parameter is determined, and the maximum allowable channel parameter of the RU is multiplied by the ratio, to obtain the schedulable channel parameter of the cell.

For example, the predicted channel parameter includes a quantity of downlink RBs. The plurality of cells are a cell 1, a cell 2, and a cell 3. The quantity of downlink RBs in the predicted channel parameter of the cell 1 is 0, the quantity of downlink RBs in the predicted channel parameter of the cell 2 is 6, the quantity of downlink RBs in the predicted channel parameter of the cell 3 is 6, and the quantity of downlink RBs in the maximum allowable channel parameter of the RU is 10. A total quantity of downlink RBs in the total predicted channel parameters of the three cells is 12. It is assumed that the cell 3 needs to be scheduled currently, and it is determined that a ratio of the quantity of downlink RBs to the total quantity of downlink RBs of the cell 3 is 1/2. The ratio is multiplied by the quantity of downlink RBs in the maximum allowable channel parameter, to obtain that the quantity of downlink RBs in the schedulable channel parameter of the cell is 5.

Optionally, if the total predicted channel parameter is less than or equal to the maximum allowable channel parameter of the RU, the predicted channel parameter of each cell is used as the schedulable channel parameter. That is, for the at least one cell, the predicted channel parameter of the at least one cell is used as the respective schedulable channel parameter.

In Case 1, for the plurality of cells of the same standard, the predicted channel parameter of each cell in the current periodicity is determined, and the schedulable channel parameter of each of the at least one cell is dynamically determined based on the maximum allowable channel parameter of the RU and the predicted channel parameter of each cell in the current periodicity, to schedule the at least one cell. That is, the plurality of cells share the maximum allowable channel parameter of the RU, and the schedulable channel parameter of each cell is determined as required, instead of based on the peak load that can be reached by each cell. In this way, when the plurality of cells do not simultaneously reach the peak load, the fronthaul bandwidth can be saved. In addition, it is proved by experiments that 20% of the fronthaul bandwidth can be saved in Case 1.

For example, referring to FIG. 9, the standard includes two cells: a cell 0 and a cell 1. The two cells share a maximum allowable channel parameter of the RU, and the schedulable channel parameters of the two cells are determined as required. The schedulable channel parameters of the two cells are not determined based on the peak load that can be reached by each cell. In this way, when the two cells do not simultaneously reach the peak load, the fronthaul bandwidth can be saved.

Case 2: The plurality of cells include cells of two different standards, which are a cell of a first standard and a cell of a second standard. In this case, the BU may determine a sum of predicted channel parameters of cells of a same standard in the plurality of cells, to obtain a total predicted channel parameter of the first standard and a total predicted channel parameter of the second standard. If a sum of the total predicted channel parameter of the first standard and the total predicted channel parameter of the second standard is greater than the maximum allowable channel parameter of the RU, a schedulable channel general parameter of the first standard and a schedulable channel general parameter of the second standard are determined based on the maximum allowable channel parameter of the RU. A schedulable channel parameter of each cell of the first standard in the at least one cell is determined based on the total schedulable channel parameter of the first standard and a ratio of a predicted channel parameter of each cell of the first standard in the at least one cell to the total predicted channel parameter of the first standard. A schedulable channel parameter of each cell of the second standard in the at least one cell is determined based on the total schedulable channel parameter of the second standard and a ratio of a predicted channel parameter of each cell of the second standard in the at least one cell to the total predicted channel parameter of the second standard.

As an example, an implementation process of determining the total schedulable channel parameter of the first standard and the total schedulable channel parameter of the second standard based on the maximum allowable channel parameter of the RU includes: subtracting the total predicted channel parameter of the first standard from the maximum allowable channel parameter of the RU to obtain the total schedulable channel parameter of the second standard, and using the total predicted channel parameter of the first standard as the total schedulable channel parameter of the first standard.

In addition, the total schedulable channel parameters of the first standard and the second standard may also be determined in other manners. For example, the total predicted channel parameter of the second standard is subtracted from the maximum allowable channel parameter of the RU to obtain the schedulable channel general parameter of the first standard, and the total predicted channel parameter of the second standard is used as the schedulable channel general parameter of the second standard. For another example, the sum of the total predicted channel parameter of the first standard and the total predicted channel parameter of the second standard is determined to obtain total predicted channel parameters of all cells, a ratio of the total predicted channel parameter of the first standard to the total predicted channel parameters of all cells is determined. The ratio is multiplied by the maximum allowable channel parameter of the RU to obtain the total schedulable channel parameter of the first standard. A ratio of the total predicted channel parameter of the second standard to the total predicted channel parameters of all the cells is determined. The ratio is multiplied by the maximum allowable channel parameter of the RU to obtain the total schedulable channel parameter of the second standard.

An implementation process of determining the schedulable channel parameter of each cell of the first standard in the at least one cell based on the total schedulable channel parameter of the first standard and the ratio of the predicted channel parameter of each cell of the first standard in the at least one cell to the total predicted channel parameter of the first standard includes the following steps. For any cell of the first standard in the at least one cell, a ratio of the predicted channel parameter of the cell to the total predicted channel parameter of the first standard is determined. The ratio is multiplied by the total schedulable channel parameter of the first standard to obtain the schedulable channel parameter of the cell.

Likewise, an implementation process of determining the schedulable channel parameter of each cell of the second standard in the at least one cell based on the total schedulable channel parameter of the second standard and the ratio of the predicted channel parameter of each cell of the second standard in the at least one cell to the total predicted channel parameter of the second standard includes the following steps. For any cell of the second standard in the at least one cell, a ratio of the predicted channel parameter of the cell to the total predicted channel parameter of the second standard is determined. The ratio is multiplied by the total schedulable channel parameter of the second standard to obtain the schedulable channel parameter of the cell.

Optionally, if the sum of the total predicted channel parameter of the first standard and the total predicted channel parameter of the second standard is less than or equal to the maximum allowable channel parameter of the RU, the predicted channel parameter of each cell is used as the schedulable channel parameter. That is, for the at least one cell, the predicted channel parameter of the at least one cell is used as the respective schedulable channel parameter.

In Case 2, for the cells of two different standards, the predicted channel parameter of each cell in the current periodicity is determined, and total schedulable channel parameters of the two standards are dynamically determined based on the maximum allowable channel parameter of the RU and the predicted channel parameter of each cell in the current periodicity, so that the schedulable channel parameter of each of the at least one cell is dynamically determined, to schedule the at least one cell. That is, the two standards share the maximum allowable channel parameter of the RU, and the total schedulable channel parameter of the two standards is determined as required, so that the schedulable channel parameter of each cell is determined as required, instead of based on the peak load that can be reached by each cell. In this way, when the plurality of cells do not simultaneously reach the peak load, the fronthaul bandwidth can be saved. In addition, it is proved by experiments that, in a case in which the two standards occupy a same spectrum bandwidth and have same channel parameters, 50% of the fronthaul bandwidth can be saved in Case 2.

For example, referring to FIG. 10, for two standards, LTE and NR, the two standards share the maximum allowable channel parameter of the RU, and the total schedulable channel parameters of the two standards are determined as required, so that the schedulable channel parameter of each cell of the two standards is determined as required. The schedulable channel parameter of each cell is not determined based on the peak load that can be reached by each cell. Taking a spectrum resource diagram in FIG. 10 as an example, the two standards share spectrum resources of the RU, and the spectrum resources required by the two standards are dynamically determined in different periodicities.

In a second case, the first predicted transmission parameter includes the predicted transmission bandwidth. In this case, the BU may determine the predicted channel parameters of the plurality of cells based on the predicted transmission bandwidths of the plurality of cells, and determine the schedulable channel parameter of the at least one cell based on the predicted channel parameters of the plurality of cells and the maximum allowable channel parameter of the RU. The BU schedules the at least one cell based on the schedulable channel parameter of the at least one cell.

There is a mapping relationship between the transmission bandwidth and the physical channel parameter. Therefore, for each of the plurality of cells, the predicted channel parameter of each cell may be determined based on the predicted transmission bandwidth of each cell and the mapping relationship.

For an implementation process of determining the schedulable channel parameter of the at least one cell based on the predicted channel parameters of the plurality of cells and the maximum allowable channel parameter of the RU, and an implementation process of scheduling the at least one cell based on the schedulable channel parameter of the at least one cell, refer to related descriptions in the first case. Details are not described herein again.

In this embodiment of this application, the first predicted transmission parameter of each of the plurality of cells is obtained, so that the schedulable channel parameter of the at least one of the plurality of cells is determined based on the first predicted transmission parameters of the plurality of cells and the maximum allowable channel parameter of the RU. In addition, a sum of the schedulable channel parameters of the plurality of cells is not greater than the maximum allowable channel parameter of the RU. In other words, the plurality of cells share the maximum allowable channel parameter of the RU, and the schedulable channel parameter of each of the at least one cell can be dynamically determined by predicting the transmission parameter required for each cell during scheduling in the current periodicity, to schedule the at least one cell based on the schedulable channel parameter of the at least one cell. The schedulable channel parameter of each cell is not determined based on the peak load that can be reached by each cell. In this way, it can be ensured that a maximum transmission bandwidth between the RU and the BU is less than a sum of maximum transmission bandwidths required by the plurality of cells, so that a fronthaul bandwidth can be saved when the plurality of cells do not simultaneously reach the peak load.

Figure 11:
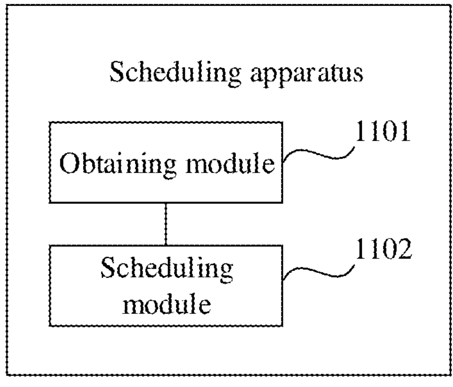
FIG. 11 is a schematic diagram of a structure of a scheduling apparatus according to an embodiment of this application.

FIG. 11 is a schematic diagram of a structure of a scheduling apparatus according to an embodiment of this application. The scheduling apparatus may be implemented as a part or all of a BU by software, hardware, or a combination thereof. The BU may be the BU shown in FIG. 1 or FIG. 2. Referring to FIG. 11, the apparatus includes an obtaining module 1101 and a scheduling module 1102.

The obtaining module 1101 is configured to obtain a first predicted transmission parameter of each of a plurality of cells, where the first predicted transmission parameter indicates a predicted transmission parameter required for each cell during scheduling in a current periodicity. For a detailed implementation process, refer to corresponding content in the foregoing embodiments. Details are not described herein again.

The plurality of cells are cells included in a signal coverage area of a radio unit RU, and a maximum transmission bandwidth between the RU and the baseband unit BU is less than a sum of the maximum transmission bandwidths required by the plurality of cells.

The scheduling module 1102 is configured to schedule at least one of the plurality of cells based on the first predicted transmission parameters of the plurality of cells. For a detailed implementation process, refer to corresponding content in the foregoing embodiments. Details are not described herein again.

Optionally, the obtaining module 1101 includes:

a receiving submodule, configured to receive the first predicted transmission parameter of each cell sent by the RU.

Optionally, the obtaining module 1101 includes:

a prediction submodule, configured to predict the transmission parameter required for each cell during scheduling in the current periodicity, to obtain the first predicted transmission parameter of each cell.

Optionally, the prediction submodule is specifically configured to:

obtain a second predicted transmission parameter and an actual transmission parameter of each cell, where the second predicted transmission parameter indicates a predicted transmission parameter required for each cell during scheduling in a previous periodicity, and the actual transmission parameter indicates a transmission parameter actually used for each cell during scheduling in the previous periodicity; and determine the first predicted transmission parameter of each cell based on the second predicted transmission parameter and the actual transmission parameter of each cell.

Optionally, the first predicted transmission parameter includes a predicted channel parameter, and the predicted channel parameter indicates a predicted physical channel parameter required for each cell during scheduling in the current periodicity.

The scheduling module 1102 includes:

a schedulable parameter determining submodule, configured to determine a schedulable channel parameter of the at least one cell based on the predicted channel parameters of the plurality of cells and a maximum allowable channel parameter of the RU; and a scheduling submodule, configured to schedule the at least one cell based on the schedulable channel parameter of the at least one cell.

Optionally, the first predicted transmission parameter includes a predicted transmission bandwidth.

The scheduling module 1102 includes:

a predicted channel parameter determining submodule, configured to determine a predicted channel parameter of each cell based on the predicted transmission bandwidths of the plurality of cells, where the predicted channel parameter indicates a predicted physical channel parameter required for each cell during scheduling in the current periodicity;

a schedulable parameter determining submodule, configured to determine a schedulable channel parameter of the at least one cell based on the predicted channel parameters of the plurality of cells and a maximum allowable channel parameter of the RU; and a scheduling submodule, configured to schedule the at least one cell based on the schedulable channel parameter of the at least one cell.

Optionally, the plurality of cells are cells of a same standard.

The schedulable parameter determining submodule is specifically configured to:

determine a sum of the predicted channel parameters of the plurality of cells, to obtain a total predicted channel parameter; and if the total predicted channel parameter is greater than the maximum allowable channel parameter, determine the schedulable channel parameter of the at least one cell based on the maximum allowable channel parameter and a ratio of the predicted channel parameter of each of the at least one cell to the total predicted channel parameter.

Optionally, the plurality of cells include cells of two different standards, which are a cell of a first standard and a cell of a second standard.

The schedulable parameter determining submodule is specifically configured to:

determine a sum of predicted channel parameters of cells of a same standard in the plurality of cells to obtain a total predicted channel parameter of the first standard and a total predicted channel parameter of the second standard;

if a sum of the total predicted channel parameter of the first standard and the total predicted channel parameter of the second standard is greater than the maximum allowable channel parameter, determine a total schedulable channel parameter of the first standard and a total schedulable channel parameter of the second standard based on the maximum allowable channel parameter;

determine a schedulable channel parameter of each cell of the first standard in the at least one cell based on the total schedulable channel parameter of the first standard and a ratio of a predicted channel parameter of each cell of the first standard in the at least one cell to the total predicted channel parameter of the first standard; and determine a schedulable channel parameter of each cell of the second standard in the at least one cell based on the total schedulable channel parameter of the second standard and a ratio of a predicted channel parameter of each cell of the second standard in the at least one cell to the total predicted channel parameter of the second standard.

Optionally, the predicted channel parameter includes at least one of the following parameters: a quantity of downlink valid physical radio resource blocks RBs, a quantity of downlink antennas, a quantity of uplink valid physical RBs, and a quantity of uplink antennas.

Optionally, the predicted channel parameter includes a quantity of user equipments of at least one of the following channels and resource information occupied by each user equipment: a downlink data channel, a downlink control channel, an uplink data channel, an uplink control channel, and a sounding reference channel.

Optionally, the resource information occupied by each user equipment of each of the downlink data channel, the downlink control channel, the uplink data channel, and the uplink control channel includes at least one of the following parameters: a quantity of RBs, a quantity of channel layers of each RB, and a quantity of channel physical antennas or a quantity of channel beams of each RB.

The resource information occupied by each user equipment of the sounding reference channel includes at least one of the following parameters: a quantity of RBs, a quantity of channel physical antennas of each RB, and a quantity of sounding reference signal symbols of each radio frame.

Optionally, the two different standards include long term evolution LTE and new radio NR.

Optionally, the plurality of cells have a same coverage area.

In this embodiment of this application, the first predicted transmission parameter of each of the plurality of cells is obtained, so that the schedulable channel parameter of the at least one of the plurality of cells is determined based on the first predicted transmission parameters of the plurality of cells and the maximum allowable channel parameter of the RU. In addition, a sum of the schedulable channel parameters of the plurality of cells is not greater than the maximum allowable channel parameter of the RU. In other words, the plurality of cells share the maximum allowable channel parameter of the RU, and the schedulable channel parameter of each of the at least one cell can be dynamically determined by predicting the transmission parameter required for each cell during scheduling in the current periodicity, to schedule the at least one cell based on the schedulable channel parameter of the at least one cell. The schedulable channel parameter of each cell is not determined based on a peak load that can be reached by each cell. In this way, it can be ensured that a maximum transmission bandwidth between the RU and the BU is less than a sum of maximum transmission bandwidths required by the plurality of cells, so that a fronthaul bandwidth can be saved when the plurality of cells do not simultaneously reach the peak load.

It should be noted that, when the scheduling apparatus provided in the foregoing embodiment performs scheduling, division of the foregoing functional modules is merely used as an example for description. In actual applications, the foregoing functions may be allocated to different functional modules for implementation based on a requirement, that is, an internal structure of the apparatus is divided into different functional modules, to implement all or some of the functions described above. In addition, the scheduling apparatus provided in the foregoing embodiment and the scheduling method embodiment belong to the same concept. For a specific implementation process thereof, refer to the method embodiments. Details are not described herein again.

Figure 12:
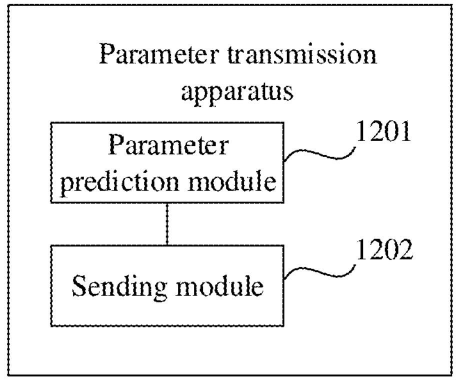
FIG. 12 is a schematic diagram of a structure of a parameter transmission apparatus according to an embodiment of this application.

FIG. 12 is a schematic diagram of a structure of a parameter transmission apparatus according to an embodiment of this application. The parameter transmission apparatus may be implemented as a part or all of an RU by software, hardware, or a combination thereof. The RU may be the RU shown in FIG. 1 or FIG. 2. Referring to FIG. 12, the apparatus includes a parameter prediction module 1201 and a sending module 1202.

The parameter prediction module 1201 is configured to predict a transmission parameter required for each of a plurality of cells during scheduling in a current periodicity, to obtain a first predicted transmission parameter of each cell. For a detailed implementation process, refer to corresponding content in the foregoing embodiments. Details are not described herein again.

The sending module 1202 is configured to send the first predicted transmission parameter of each cell to a baseband unit BU. For a detailed implementation process, refer to corresponding content in the foregoing embodiments. Details are not described herein again.

The plurality of cells are cells included in a signal coverage area of a radio unit RU, and a maximum transmission bandwidth between the RU and the BU is less than a sum of the maximum transmission bandwidths required by the plurality of cells.

Optionally, the parameter prediction module 1201 is specifically configured to:

obtain a second predicted transmission parameter and an actual transmission parameter of each cell, where the second predicted transmission parameter indicates a predicted transmission parameter required for each cell during scheduling in a previous periodicity, and the actual transmission parameter indicates a transmission parameter actually used for each cell during scheduling in the previous periodicity; and determine the first predicted transmission parameter of each cell based on the second predicted transmission parameter and the actual transmission parameter of each cell.

Optionally, the first predicted transmission parameter includes a predicted channel parameter or a predicted transmission bandwidth, and the predicted channel parameter indicates a predicted physical channel parameter required for each cell during scheduling in the current periodicity.

Optionally, the predicted channel parameter includes at least one of the following parameters: a quantity of downlink valid physical radio resource blocks RBs, a quantity of downlink antennas, a quantity of uplink valid physical RBs, and a quantity of uplink antennas.

Optionally, the predicted channel parameter includes a quantity of user equipments of at least one of the following channels and resource information occupied by each user equipment: a downlink data channel, a downlink control channel, an uplink data channel, an uplink control channel, and a sounding reference channel.

Optionally, the resource information occupied by each user equipment of each of the downlink data channel, the downlink control channel, the uplink data channel, or the uplink control channel includes at least one of the following parameters: a quantity of RBs, a quantity of channel layers of each RB, and a quantity of channel physical antennas or a quantity of channel beams of each RB.

The resource information occupied by each user equipment of the sounding reference channel includes at least one of the following parameters: a quantity of RBs, a quantity of channel physical antennas of each RB, and a quantity of sounding reference signal symbols of each radio frame.

Optionally, the plurality of cells are cells of a same standard, or the plurality of cells include cells of two different standards.

Optionally, the two different standards include long term evolution LTE and new radio NR.

Optionally, the plurality of cells have a same coverage area.

In this embodiment of this application, the first predicted transmission parameter of each of the plurality of cells is obtained, so that the schedulable channel parameter of the at least one of the plurality of cells is determined based on the first predicted transmission parameters of the plurality of cells and the maximum allowable channel parameter of the RU. In addition, a sum of the schedulable channel parameters of the plurality of cells is not greater than the maximum allowable channel parameter of the RU. In other words, the plurality of cells share the maximum allowable channel parameter of the RU, and the schedulable channel parameter of each of the at least one cell can be dynamically determined by predicting the transmission parameter required for each cell during scheduling in the current periodicity, to schedule the at least one cell based on the schedulable channel parameter of the at least one cell. The schedulable channel parameter of each cell is not determined based on a peak load that can be reached by each cell. In this way, it can be ensured that a maximum transmission bandwidth between the RU and the BU is less than a sum of maximum transmission bandwidths required by the plurality of cells, so that a fronthaul bandwidth can be saved when the plurality of cells do not simultaneously reach the peak load.

It should be noted that, when the parameter transmission apparatus provided in the foregoing embodiments performs parameter transmission, division of the foregoing functional modules is merely used as an example for description. In actual applications, the foregoing functions may be allocated to different functional modules for implementation based on a requirement, that is, an internal structure of the apparatus is divided into different functional modules, to implement all or some of the functions described above. In addition, the parameter transmission apparatus provided in the foregoing embodiment and the parameter transmission method embodiment belong to the same concept. For a specific implementation process thereof, refer to the method embodiments. Details are not described herein again.

An embodiment of this application further provides a scheduling system. The scheduling system includes an RU and a BU.

The RU is configured to predict a transmission parameter required for each cell of a plurality of cells during scheduling in a current periodicity, to obtain a first predicted transmission parameter of each cell, and send the first predicted transmission parameter of each cell to the BU.

The BU is configured to receive the first predicted transmission parameter of each cell sent by the RU, and schedule at least one of the plurality of cells based on the first predicted transmission parameters of the plurality of cells.

The plurality of cells are cells included in a signal coverage area of a radio unit RU, and a maximum transmission bandwidth between the RU and the baseband unit BU is less than a sum of the maximum transmission bandwidths required by the plurality of cells.

For a detailed implementation process of functions implemented by the BU and the RU, refer to corresponding content in the foregoing embodiments. Details are not described herein again.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from one computer-readable storage medium to another computer-readable storage medium. For example, the computer instructions may be transmitted from one network device or computer to another network device or computer in a wired (for example, an optical fiber) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state disk (solid-state disk, SSD)), or the like. It should be noted that, the computer-readable storage medium mentioned in this embodiment of this application may be a non-volatile storage medium, or in other words, may be a non-transitory storage medium.

It should be understood that "at least one" mentioned in this specification means one or more, and "a plurality of" mentioned in this specification means two or more. In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing descriptions are merely embodiments of this application, but are not intended to limit this application. Any modification, equivalent replacement, or improvement made without departing from the spirit and principle of this application shall fall within the protection scope of this application.

What is claimed is:

1. A scheduling method, wherein the method comprises:
obtaining a first predicted transmission parameter of each corresponding cell of a plurality of cells, wherein the first predicted transmission parameter indicates a predicted transmission parameter required for the corresponding cell during scheduling in a current periodicity,
the plurality of cells are in a signal coverage area of a network device configured as a radio unit (RU), and
a maximum transmission bandwidth between the RU and a further network device configured as a baseband unit (BU) is less than a sum of maximum transmission bandwidths required by the plurality of cells; and
scheduling at least one cell of the plurality of cells based on the first predicted transmission parameters of the plurality of cells.

2. The method according to claim 1, wherein the obtaining the first predicted transmission parameter of the corresponding cell comprises:
receiving the first predicted transmission parameter of the corresponding cell sent by the RU.

3. The method according to claim 1, wherein the obtaining the first predicted transmission parameter of the corresponding cell comprises:
predicting the transmission parameter required for the corresponding cell during scheduling in the current periodicity, to obtain the first predicted transmission parameter of the corresponding cell.

4. The method according to claim 3, wherein the predicting the transmission parameter required for the corresponding cell during scheduling in the current periodicity comprises:
obtaining a second predicted transmission parameter and an actual transmission parameter of the corresponding cell, wherein
the second predicted transmission parameter indicates a predicted transmission parameter required for the corresponding cell during scheduling in a previous periodicity, and
the actual transmission parameter indicates a transmission parameter actually used for the corresponding cell during scheduling in the previous periodicity; and
determining the first predicted transmission parameter of the corresponding cell based on
the second predicted transmission parameter, and
the actual transmission parameter of the corresponding cell.

5. The method according to claim 1, wherein
the first predicted transmission parameter comprises a predicted channel parameter which indicates a predicted physical channel parameter required for the corresponding cell during scheduling in the current periodicity; and
the scheduling the at least one cell comprises:
determining a schedulable channel parameter of the at least one cell based on the predicted channel parameters of the plurality of cells, and
a maximum allowable channel parameter of the RU; and
scheduling the at least one cell based on the schedulable channel parameter of the at least one cell.

6. The method according to claim 5, wherein
the plurality of cells comprises cells of a same standard; and
the determining the schedulable channel parameter of the at least one cell comprises:
determining a sum of the predicted channel parameters of the plurality of cells, to obtain a total predicted channel parameter; and
in response to the total predicted channel parameter being greater than the maximum allowable channel parameter, determining the schedulable channel parameter of the at least one cell based on
the maximum allowable channel parameter, and
a ratio of the predicted channel parameter of each of the at least one cell to the total predicted channel parameter.

7. The method according to claim 5, wherein
the plurality of cells comprises one or more cells of a first standard, and one or more cells of a second standard different from the first standard;
the determining the schedulable channel parameter of the at least one cell comprises:
determining a sum of the predicted channel parameters of the one or more cells of the first standard to obtain a total predicted channel parameter of the first standard, and determining a sum of the predicted channel parameters of the one or more cells of the second standard to obtain a total predicted channel parameter of the second standard;
in response to a sum of the total predicted channel parameter of the first standard and the total predicted channel parameter of the second standard being greater than the maximum allowable channel parameter, determining a total schedulable channel parameter of the first standard and a total schedulable channel parameter of the second standard based on the maximum allowable channel parameter;
determining a schedulable channel parameter of each cell of the first standard in the at least one cell based on
the total schedulable channel parameter of the first standard, and
a ratio of the predicted channel parameter of said each cell of the first standard in the at least one cell to the total predicted channel parameter of the first standard; and
determining a schedulable channel parameter of each cell of the second standard in the at least one cell based on
the total schedulable channel parameter of the second standard, and a ratio of the predicted channel parameter of said each cell of the second standard in the at least one cell to the total predicted channel parameter of the second standard.

8. The method according to claim 5, wherein the predicted channel parameter comprises at least one of:

a quantity of downlink valid physical radio resource blocks (RBs), a quantity of downlink antennas, a quantity of uplink valid physical RBs, or a quantity of uplink antennas.

9. The method according to claim 5, wherein the predicted channel parameter comprises a quantity of user equipments and resource information occupied by each user equipment of at least one of:

a downlink data channel, a downlink control channel, an uplink data channel, an uplink control channel, or a sounding reference channel.

10. The method according to claim 9, wherein the resource information occupied by each user equipment of each of the downlink data channel, the downlink control channel, the uplink data channel, and the uplink control channel comprises at least one of:

a quantity of resource blocks (RBs), a quantity of channel layers of each RB, or a quantity of channel physical antennas or a quantity of channel beams of each RB; and the resource information occupied by each user equipment of the sounding reference channel comprises at least one of:

a quantity of RBs, a quantity of channel physical antennas of each RB, or a quantity of sounding reference signal symbols of each radio frame.

11. The method according to claim 1, wherein the first predicted transmission parameter comprises a predicted transmission bandwidth; and the scheduling the at least one cell comprises:

determining a predicted channel parameter of each corresponding cell of the plurality of cells based on the predicted transmission bandwidths of the plurality of cells, wherein the predicted channel parameter indicates a predicted physical channel parameter required for the corresponding cell during scheduling in the current periodicity;

determining a schedulable channel parameter of the at least one cell based on the predicted channel parameters of the plurality of cells and a maximum allowable channel parameter of the RU; and scheduling the at least one cell based on the schedulable channel parameter of the at least one cell.

12. A parameter transmission method, wherein the method comprises:

obtaining a first predicted transmission parameter of each corresponding cell of a plurality of cells, by predicting a transmission parameter required for the corresponding cell during scheduling in a current periodicity; and sending the first predicted transmission parameters of the plurality of cells to a network device configured as a baseband unit (BU), wherein the plurality of cells are in a signal coverage area of a further network device configured as a radio unit (RU), and a maximum transmission bandwidth between the RU and the BU is less than a sum of maximum transmission bandwidths required by the plurality of cells.

13. The method according to claim 12, wherein the predicting the transmission parameter required for the corresponding cell during scheduling in the current periodicity comprises:

obtaining a second predicted transmission parameter and an actual transmission parameter of the corresponding cell, wherein the second predicted transmission parameter indicates a predicted transmission parameter required for the corresponding cell during scheduling in a previous periodicity, and the actual transmission parameter indicates a transmission parameter actually used for the corresponding cell during scheduling in the previous periodicity; and determining the first predicted transmission parameter of the corresponding cell based on the second predicted transmission parameter, and the actual transmission parameter of the corresponding cell.

14. The method according to claim 12, wherein the first predicted transmission parameter comprises a predicted channel parameter of the corresponding cell, or a predicted transmission bandwidth of the corresponding cell, and the predicted channel parameter indicates a predicted physical channel parameter required for the corresponding cell during scheduling in the current periodicity.

15. The method according to claim 14, wherein the predicted channel parameter comprises at least one of:

a quantity of downlink valid physical radio resource blocks (RBs), a quantity of downlink antennas, a quantity of uplink valid physical RBs, or a quantity of uplink antennas.

16. The method according to claim 14, wherein the predicted channel parameter comprises a quantity of user equipments and resource information occupied by each user equipment of at least one of:

a downlink data channel, a downlink control channel, an uplink data channel, an uplink control channel, or a sounding reference channel.

17. The method according to claim 16, wherein the resource information occupied by each user equipment of each of the downlink data channel, the downlink control channel, the uplink data channel, and the uplink control channel comprises at least one of:

a quantity of resource blocks (RBs), a quantity of channel layers of each RB, or a quantity of channel physical antennas or a quantity of channel beams of each RB; and the resource information occupied by each user equipment of the sounding reference channel comprises at least one of:

a quantity of RBs, a quantity of channel physical antennas of each RB, or a quantity of sounding reference signal symbols of each radio frame.

18. An apparatus, wherein the apparatus comprises a processor configured to:

obtain a first predicted transmission parameter of each corresponding cell of a plurality of cells, wherein the first predicted transmission parameter indicates a predicted transmission parameter required for the corresponding cell during scheduling in a current periodicity, the plurality of cells are in a signal coverage area of a network device configured as a radio unit (RU), and a maximum transmission bandwidth between the RU and a further network device configured as a baseband unit (BU) is less than a sum of maximum transmission bandwidths required by the plurality of cells; and schedule at least one cell of the plurality of cells based on the first predicted transmission parameters of the plurality of cells.

19. An apparatus, wherein the apparatus comprises:

a processor configured to obtain a first predicted transmission parameter of each corresponding cell of a plurality of cells, by predicting a transmission parameter required for the corresponding cell during scheduling in a current periodicity; and a transceiver configured to send the first predicted transmission parameters of the plurality of cell to a network device configured as a baseband unit (BU), wherein the plurality of cells are in a signal coverage area of a further network device configured as a radio unit (RU), and a maximum transmission bandwidth between the RU and the BU is less than a sum of maximum transmission bandwidths required by the plurality of cells.

* * * * *